United States Patent
Ashe

[11] Patent Number: 5,312,188
[45] Date of Patent: May 17, 1994

[54] TEMPERATURE SENSING APPARATUS

[75] Inventor: John B. Ashe, Asheville, N.C.

[73] Assignee: Figgie International Inc., Willoughby, Ohio

[21] Appl. No.: 42,980

[22] Filed: Apr. 5, 1993

[51] Int. Cl.⁵ .......................... G01K 5/62; G01K 1/14
[52] U.S. Cl. .................................. 374/155; 374/207; 374/208; 137/845
[58] Field of Search ............... 374/155, 205, 206, 207, 374/208, 141; 137/845

[56] References Cited

U.S. PATENT DOCUMENTS

| | | | |
|---|---|---|---|
| 236,719 | 1/1881 | Renton | 137/845 |
| 1,648,793 | 11/1927 | Weber | 137/845 |
| 3,373,611 | 3/1968 | Trott | 374/155 |
| 3,623,370 | 11/1971 | Busch et al. | 374/207 |
| 3,636,769 | 1/1972 | Chaney | 374/190 |
| 3,851,529 | 12/1974 | Andrews et al. | 374/206 |
| 4,232,518 | 11/1980 | Suzuki et al. | 137/845 |
| 4,302,965 | 12/1981 | Johnson et al. | 374/142 |
| 4,595,301 | 6/1986 | Taylor | 374/207 |
| 4,794,942 | 1/1989 | Yasuda et al. | 137/845 |
| 4,958,938 | 9/1990 | Schwartz et al. | 374/208 |

*Primary Examiner*—Diego F. F. Gutierrez
*Attorney, Agent, or Firm*—Ralph E. Jocke

[57] ABSTRACT

A temperature sensing apparatus (10) adapted for sensing the temperature of a food item in an oven includes a body (12) which encloses a chamber (34). The chamber houses an indicator (20) which is viewed through a glass pane (28). Slight amounts of water vapor that infiltrate into the chamber during washing are safely vented by a pressure relief valve (36) having a unitary body of resilient material. The check valve includes a membrane portion (40) with a diametrically extending slit (46) therethrough. The slit remains closed under most conditions. When pressure builds in the chamber during heating due to rapid expansion of infiltrated water vapor, the membrane portion deforms sufficiently to open the slit before the pressure reaches a level that may fracture the glass pane or cause other damage. When the pressure falls, the membrane portion returns to its initial position closing the slit.

15 Claims, 2 Drawing Sheets

5,312,188

TEMPERATURE SENSING APPARATUS

TECHNICAL FIELD

This invention relates to temperature sensing instruments. Particularly this invention relates to a thermometer for use in sensing the temperature of a heated item, such as a food item in an oven environment.

BACKGROUND ART

Many types of thermometers are known in the prior art. A popular type of thermometer is a cooking thermometer that includes a probe portion which is inserted in a food item being cooked in an oven. A cooking thermometer typically includes a dial or other visual readout that indicates how hot the food is. By observing the temperature of the food, and by monitoring the cooking time in the oven, it is assured that the food is properly cooked.

Most cooking thermometers include a body which encloses a chamber. The chamber houses an indicator that visually displays the temperature at the probe portion. The chamber is bounded by a glass pane through which the indicator is observed. A gasket is typically mounted under the glass pane to seal the chamber from the environment.

Cooking thermometers must be thoroughly cleaned between uses. This is done to remove food particles and avoid the growth of harmful bacteria. The most common way of washing a cooking thermometer is to place it in an automatic washer in which it is immersed in a hot water based cleaning solution.

Because of the different rates of thermal expansion of the glass pane and the typical metal body of the cooking thermometer, water vapor may infiltrate past the gasket into the chamber. When this occurs, water vapor is trapped inside the chamber upon cooling.

When a cooking thermometer with water trapped inside is placed in an oven, the water vapor will expand rapidly upon heating, causing pressure to build up in the chamber. Such pressure make cause damage to the seal; or, if the seal does not rupture, the glass pane may fracture. In either event, the thermometer becomes unusable.

Thus, there exists a need for a temperature sensing apparatus that may be used to sense temperature in a hot oven environment, but which will not be damaged by the infiltration of water vapor which may enter the body of the apparatus during cleaning.

DISCLOSURE OF INVENTION

It is an object of the present invention to provide a temperature sensing apparatus that is used to sense temperatures by placement in a hot oven environment.

It is a further object of the present invention to provide a temperature sensing apparatus that may be immersed in water for cleaning.

It is a further object of the present invention to provide a temperature sensing apparatus that will not be damaged by water vapor that infiltrates into the interior of the device.

It is a further object of the present invention to provide a temperature sensing apparatus that includes pressure relief means for safely relieving pressure from the interior of the apparatus.

It is a further object of the present invention to provide a temperature sensing apparatus that includes pressure relief means that reseals itself once the pressure in the apparatus is relieved.

It is a further object of the present invention to provide a temperature sensing apparatus that is accurate, reliable, and durable.

It is a further object of the present invention to provide a method for relieving pressure within the body of a temperature sensing apparatus.

Further objects of the present invention will be made apparent for the following Best Mode For Carrying Out Invention and the appended claims.

The foregoing objects are accomplished in the preferred embodiment of the present invention by a cooking thermometer used in an oven environment for indicating the temperature of a food item. The cooking thermometer has a body that includes a probe portion for insertion into the food item. The body also includes an internal chamber which houses an indicator for indicating the temperature at the probe portion. The indicator is controlled by a thermal expansion spring which is adapted to move the indicator in response to thermal expansion. The internal chamber of the thermometer is bounded at the front side by a glass pane which enables viewing the indicator therethrough.

The chamber of the cooking thermometer is bounded at its back side by a back wall. The back wall has a circular opening therethrough into the chamber. The opening is closed by a check valve positioned therein. The check valve has a resilient body of unitary construction which includes a membrane portion. The membrane portion is exposed to the pressure in the chamber at its interior surface and exposed to the environment at its exterior surface.

The membrane portion of the check valve has a perforation in the form of a slit extending therethrough. The resilient character of the check valve and the memory properties of the material maintains the slit closed when the membrane portion is not exposed to pressure inside the chamber.

During washing of the cooking thermometer, small amounts of water may infiltrate into the chamber. The usual source of water infiltration is slight leaking around the glass pane.

When the thermometer is next placed in an oven environment, the water vapor expands rapidly. The expansion increases the pressure in the chamber. This internal pressure deforms the membrane portion of the check valve. Eventually, with building pressure, the deformation of the membrane portion is sufficient to open the slit, exhausting the pressure from the chamber into the environment. Once the excess pressure is released, the membrane portion returns to its initial position closing the slit so that the chamber is again sealed.

The cooking thermometer of the present invention uses a check valve made of resilient, high temperature silicone material which enables the thermometer to be used successfully through many cooking and cleaning cycles.

BEST MODE FOR CARRYING OUT INVENTION

Figures 1, 2:
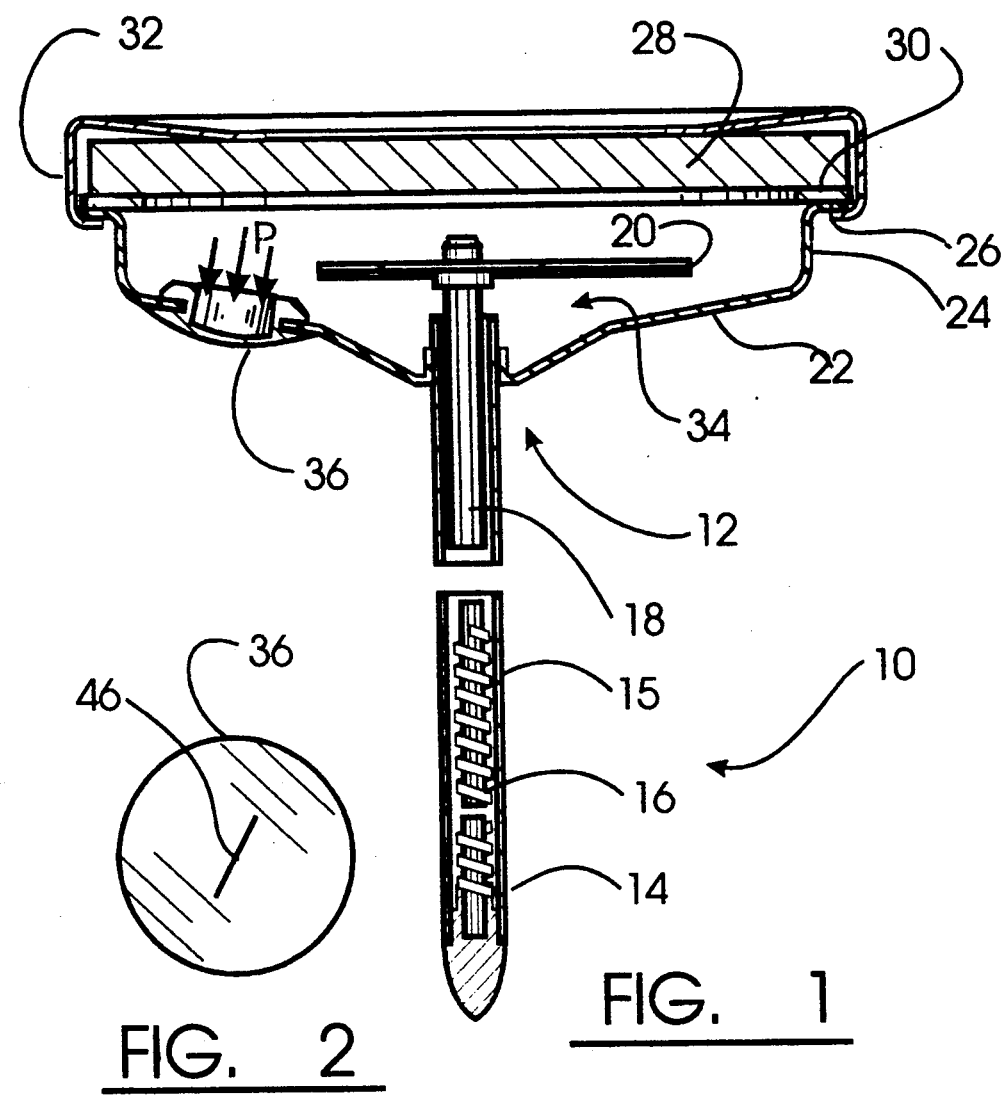
FIG. 1 is a cross sectional view of the preferred embodiment of the temperature sensing apparatus of the present invention.
FIG. 2 is a plan view of the body of the pressure relief valve of the temperature sensing apparatus.

Referring now to the drawings, and particularly to FIG. 1, there is shown therein the preferred embodiment of the temperature sensing apparatus of the present invention generally indicated 10. The apparatus is specifically adapted for use as a cooking thermometer and includes a body 12 with a probe portion 14. Probe portion 14 is adapted for insertion into foods such as meat or poultry for sensing the temperature thereof during cooking.

Probe portion 14 is bounded by a stem 14 which encloses a thermal expansion spring 16. Thermal expansion spring 16 is connected to a shaft 18. An indicator 20 is mounted on shaft 18 and rotates therewith. Spring 16 expands and contracts in a rotational direction in response to the temperature of probe portion 14. This results in movement of indicator 20. The position of the indicator, which may be a pointer or other suitable indicating member, is indicative of temperature.

Body 12 includes a back wall 22 through which stem 15 extends. Back wall 22 in cross section includes upturned portions 24 and terminates in an outwardly directed circular projection 26. A glass pane 28 is positioned in supported relation on projection 26. A resilient circular gasket 30 extends between pane 28 and projection 26 to provide a seal. A circular C-shaped clamping member 32 extends about the periphery of pane 28 and holds the pane and projection 26 in connected relation. The body 12 and glass pane 28 enclose an internal chamber generally indicated 34 inside the thermometer.

As will be understood by those skilled in the art, suitable gradations are provided so that the position of indicator 20 may be correlated with temperature. These gradations may be provided in a conventional manner such as by application of a scale to the inside surface of pane 28, or on the inside surface of back wall 22, or a combination of both.

Figure 3:
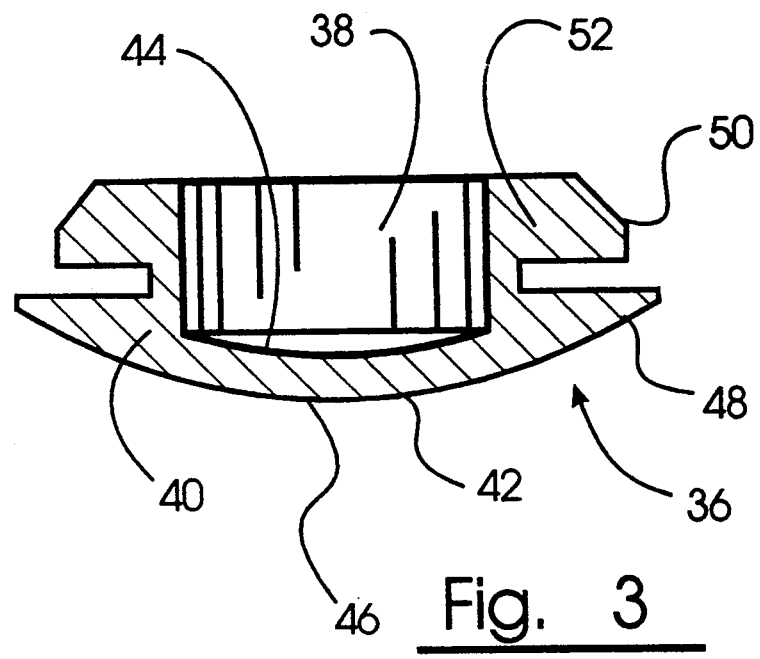
FIG. 3 is a cross sectional view of the pressure relief valve.
Figure 4:
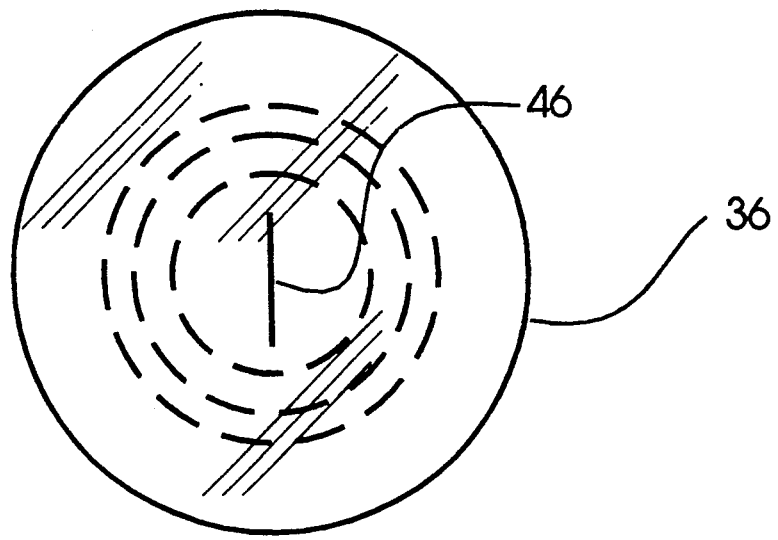
FIG. 4 is a plan view of the pressure relief valve.

A circular opening (not separately shown) extends through back wall 22 of the apparatus. A pressure relief valve 36 is mounted in the opening. As best shown in FIGS. 3 and 4, pressure relief valve 36 has a unitary, generally circular body made of resilient material. It includes, in cross section, a cylindrical recess 38 that is open to chamber 34. Recess 38 is bounded outwardly by a membrane portion 40 which serves as membrane means for separating chamber 34 from its external environment. Membrane portion 40 is bounded by a convex outer surface 42 and a convex inner surface 44.

A diametrically extending slit 46 extends through membrane portion 40. Slit 46 serves as a perforation means, and due to the resilient character of the membrane portion 40, is normally closed in the undeformed condition of check valve 36.

Check valve 36 further includes an exterior lip portion 48 that abuts an outside surface of back wall 22 when the valve is installed therein. The check valve also includes an interior lip portion 50 which abuts an inside surface of back wall 22. Check valve 36 also has a thickened area 52 adjacent interior lip portion 50. Thickened area 52 adds strength to lip portion 50 and helps to prevent the check valve 36 from being pushed outwardly through the opening in back wall 22 due to pressure in chamber 34.

In operation, the temperature sensing apparatus 10 is placed in an oven with the probe portion extending into the food item being cooked. The temperature of the probe portion is indicated by the position of indicator 20.

If water vapor has entered chamber 34 during washing, the heating of the water vapor causes it to rapidly expand and pressure builds in chamber 34. The pressure applies an outwardly directed force against membrane portion 40 of check valve 36 which is indicated by arrows P in FIG. 1. The pressure in chamber 34 deforms the membrane portion until slit 46 is pushed open. When this occurs the excess pressure in chamber 34 escapes to the environment.

Once the excess pressure has escaped, the membrane portion is no longer deformed sufficiently by the internal pressure to hold the slit 46 open. The memory properties of the resilient material from which the check valve 36 is made cause the membrane portion to return to its initial condition which closes the slit. If pressure again builds in the chamber, the slit will again be forced open to repeat the process. The use of relief valve 36 avoids pressure build up that would otherwise damage seal 30 or fracture the glass pane 28.

In the preferred embodiment of the invention the check valve is made from five hundred degree Fahrenheit silicone rubber. It has a hardness of approximately 50 durometer. The check valve is made from compound 40150 which is available from Silicone Rubber Right Products, Inc. of Northlake, Ill. In the preferred embodiment the membrane is generally 1/32 inch in thickness and the slit is generally ⅛ inch in length. Applicant has found that this configuration provides reliable pressure relief in the range of from 10 to 15 psig. Of course, in other embodiments other materials and configurations may be successfully used.

The check valve of the present invention also prevents the introduction of excessive moisture into the chamber during washing or immersion in water. As a result, the apparatus may be washed in automatic washing machines which include high temperature and pressure water spray without adverse affects. The invention is a reliable temperature sensing apparatus that is durable and has a long useful life.

Thus, the new temperature sensing apparatus of the present invention achieves the above stated objectives, eliminates difficulties encountered in the use of prior devices and systems, solves problems, and attains desirable results described herein.

In the foregoing description certain terms have been used for brevity, clarity, and understanding, however, no unnecessary limitations are to be implied therefrom because such terms are used for descriptive purposes and are intended to be broadly construed. Moreover, the descriptions and illustrations given are by way of examples and the invention is not limited to the exact details shown or described.

Having described the features, discoveries, and principles of the invention, the manner in which it is operated and utilized, and the advantages and use of results obtained; the new and useful structures, devices, elements, arrangements, parts, combinations, systems, equipment, operations, methods, and relationships are set forth in the appended claims.

I claim:

1. An apparatus for indicating a condition of an environment, comprising:
   a body enclosing a chamber, said body including a wall having an opening therethrough, said wall having an interior surface and an exterior surface;

means in said chamber for indicating the condition of the environment; and, a valve mounted in said opening, said valve including an interior lip portion overlying said interior surface adjacent said opening, an exterior lip portion overlying said exterior surface adjacent said opening, and a resilient membrane portion separating said chamber from said environment and having a slit therethrough, wherein pressure in said chamber is relievable through said slit.

2. An apparatus for indicating a condition of its environment and adapted for use in a high temperature oven environment and alternatively for immersion in water, comprising:

a body enclosing a chamber, said body including a wall having an opening therethrough, said wall having an interior surface and an exterior surface;

means in said chamber for indicating the condition of the environment in which said apparatus is positioned; and a valve mounted in said opening, said valve comprising a resilient interior lip portion overlying said interior surface adjacent said opening, a resilient exterior lip portion overlying said exterior surface adjacent said opening, and a resilient membrane portion separating said chamber from said environment and having a slit therethrough, wherein pressure in said chamber is relievable through said slit.

3. The apparatus according to claim 2 wherein said valve is comprised of resilient material and is of unitary construction.

4. A temperature sensing apparatus for displaying temperatures in an environment where the apparatus is positioned, said apparatus being exposed to periodic temperature fluctuations that include high temperatures, said apparatus comprising:

a body, said body enclosing a chamber, said body including a wall bounding said chamber having an opening therethrough, said wall having an interior surface and an exterior surface;

display means on said body for displaying the temperature in the environment wherein said body is positioned; and pressure relief means mounted in said opening for reliving pressure in said chamber to said environment when said pressure in said chamber exceeds a pressure level, said pressure relief means comprising a resilient exterior lip means for overlying said exterior surface adjacent said opening, a resilient interior lip means for overlying said interior surface adjacent said opening, and a membrane means for separating said chamber from said environment and for closing said opening, said membrane means including a perforation means therethrough for opening said membrane means through said perforation means when said pressure level is exceeded and for closing said membrane means when said pressure has dropped below said pressure level.

5. The apparatus according to claim 4 wherein said pressure relief means further comprises in cross section a resilient thickened area disposed interiorally of said interior lip means, whereby outward displacement of said interior lip means of said pressure relief means is resisted.

6. The apparatus according to claim 5 wherein said opening through said wall is generally circular in cross section and wherein said pressure relief means is comprised of resilient material and is of unitary construction.

7. The apparatus according to claim 6 wherein said perforation means comprises a slit extending traversly through said membrane means.

8. The apparatus according to claim 7 wherein said pressure relief means includes a resilient body that is generally circular in cross section and wherein said slit extends diametrically with respect of said body.

9. The apparatus according to claim 8 wherein a generally cylindrical recess in said resilient body bounds said slit inwardly in said chamber.

10. The apparatus according to claim 9 wherein said membrane means is bounded exteriorally by a convexly extending outer surface.

11. The apparatus according to claim 10 wherein said membrane means is bounded interiorally by a convexly extending inner surface of said recess.

12. The apparatus according to claim 11 wherein said display means includes an indicator in said chamber and a glass pane for viewing said indicator in said chamber, and wherein said pressure relief means relieves pressure in said chamber below a fracture pressure of said glass pane.

13. The apparatus according to claim 12 wherein said pressure relief means is comprised of 500 degree Fahrenheit silicon rubber.

14. The apparatus according to claim 13 wherein said indicator is positioned by thermal expansion means, and wherein said wall including said opening for said pressure relief means extends generally opposite said glass pane on said body.

15. The apparatus according to claim 14 wherein said thermal expansion means is housed in a probe portion of said body, said probe portion adapted for insertion into a food item for indicating the temperature thereof.

* * * * *